3,243,404
SILYL AMINE PROCESSING AIDS FOR POLYSILOXANE ELASTOMERS
Arthur C. Martellock, Schenectady, N.Y., assignor to General Electric Company, a corporation of New York
No Drawing. Filed Apr. 2, 1962, Ser. No. 184,519
18 Claims. (Cl. 260—37)

The present invention relates to organopolysiloxane compositions convertible to improved organopolysiloxane elastomers and to a process for making such compositions. More particularly, the present invention relates to a curable composition comprising an organopolysiloxane polymer convertible to the cured, solid, elastic state, a silicon-nitrogen material having intercondensed silazane units, or silylamine units or a mixture thereof, and a finely divided inorganic oxide filler.

As is generally known to those skilled in the art, the tensile strength of an organopolysiloxane elastomer reinforced with an inorganic oxide filler having a high surface area is substantially better than the corresponding unreinforced organopolysiloxane elastomer. Although the incorporation of a finely divided inorganic oxide filler into an organopolysiloxane polymer convertible to the cured, solid, elastic state, provides for the production of substantially improved inorganopolysiloxane elastomers, prior to the present invention, the production of organopolysiloxane elastomers from an uncured mixture of filler and organopolysiloxane polymer was often subject to considerable processing difficulties. During the introduction of filler into polymer, for example, such as by means of a rubber mill, or after a filler-polymer mixture has aged for even a relatively short period of time, for instance a few hours or more, it quite often "structures," i.e., it becomes tough and nervy. Structure of the polymer-filler mixture can be readily recognized by the presence of an undesirable snap, and difficulty in rendering plastic, the filler-polymer mixture by usual mechanical working. In order to overcome the effects of structure, such as when it is necessary to incorporate various additives such as a curing catalyst, pigments, etc., into the filler-polymer mixture or to employ the mixture in conventional applications such as molding, etc., at a subsequent period of time, excessive milling of the polymer-filler mixture is often required. The overall economics of the operation as a result can be adversely affected. It would be desirable, therefore, to be able to incorporate a finely divided inorganic oxide, such as a silica filler, into an organopolysiloxane polymer convertible to the cured, solid, elastic state to form an organopolysiloxane composition which is capable of being stored for an extended period of time such as several months or more, and which can be thereafter satisfactorily utilized without excessive milling, for the production of improved organopolysiloxane elastomers.

The present invention is based on the discovery that organopolysiloxane compositions comprising an organopolysiloxane polymer convertible to the cured, solid, elastic state, a reinforcing amount of an inorganic oxide filler having a high surface area and an effective amount of process aid in the form of a silicon-nitrogen material such as a silylamine or a silazane, can be stored for an extended period of time, and utilized thereafter for the production of improved high strength organopolysiloxane elastomers, without the necessity of excessive milling prior to cure. The organopolysiloxane compositions of the present invention can be formed by milling together in the presence of an effective amount of the aforedescribed silicon-nitrogen materials, an organopolysiloxane polymer convertible to the cured, solid, elastic state, and a reinforcing amount of an inorganic oxide filler having a high surface area, to form a uniform mixture.

In accordance with the present invention, there is provided organopolysiloxane compositions convertible to the cured, solid, elastic state, which comprise (A) 100 parts of an organopolysiloxane having a viscosity of at least 100,000 centipoises at 25° C. of the formula:

(1) 

(B) 0.1 to 100 parts, and preferably 4 to 50 parts of a silicon-nitrogen material, and (C) from 5 to 200 parts of a filler having a specific surface in the range of from 20 to 800 meters per gram, said silicon-nitrogen material being a member selected from the class consisting of:
 (a) a silyl amine having the formula (2) $(R')_b Si(N(R'')_2)_{4-b}$ and
 (b) a silicon-nitrogen compound having the formula

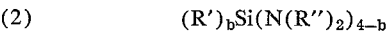

where Y is selected from R''' and R''$_2$N—,
 (c) a silicon-nitrogen polymer comprising (1) from 3 to 100 mole percent chemically combined structural units selected from the class consisting of units having the formula

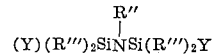

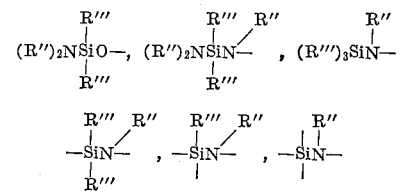

and (2) from 0 to 97 mole percent chemically combined structural units represented by the formula

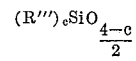

where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazy unit are joined to a member selected from an R'' radical and (R'')$_2$N radical, and where the ratio of the sum of said R''' radicals and said (R'')$_2$N radicals to the silicon atoms of said silicon-nitrogen polymer has a value of 1.5 to 3, inclusive, where R is a member selected from monovalent hydrocarbon radicals, halogenated monovalent hydrocarbon radicals and a mixture of monovalent hydrocarbon radicals and cyanoalkyl radicals, R' is a member selected from the class consisting of hydrogen, monovalent hydrocarbon radicals, and alkoxy radicals having a carbon chain length of from 1 to 8 carbon atoms, and R'' is a member selected from the class consisting of hydrogen and monovalent hydrocarbon radicals, R''' is a member selected from hydrogen, monovalent hydrocarbon radicals and cyanoalkyl radicals, $a$ is equal to from 1.95 to 2.01, $b$ is an integer equal to from 2 to 3, inclusive, and $c$ is a whole number equal to 0 to 3, inclusive.

Radicals included by R of Formula 1 are aryl radicals, and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl, including methyl, ethyl, propyl, chlorobutyl, cyclohexyl, etc.; cyanoalkyl radicals, such as cyanoethyl, cyanopropyl, cyanobutyl, etc.; radicals included by R' of Formula 2 are hydrogen and aryl radicals such as phenyl, tolyl, etc.; aralkyl radicals such as phenylethyl, benzyl, etc.; aliphatic and cycloaliphatic radicals, such as alkyl, alkenyl, cycloalkyl, including methyl, ethyl, propyl, octyl, etc.; alkoxy such as methoxy, ethoxy, butoxy, octanoxy, etc.; radicals included by R″ above are hydrogen and all the aforementioned monovalent hydrocarbon radicals included by R above that are free of halogen substitution; radicals included by R‴ above are all the aforementioned R″ radicals and cyanoalkyl radicals such as cyanoethyl, cyanopropyl, cyanobutyl, etc.; R, R″ and R‴ separately can be all the same radical or any two or more of the aforementioned radicals respectively included above by R, R′, R″ and R‴. R is preferably methyl, or a mixture of methyl, phenyl and vinyl having up to 80 mole percent or more of methyl, based on the total moles of R radicals; R′ and R‴ are also preferably methyl and R″ is preferably hydrogen.

In addition to the above described silicon-nitrogen materials, there are also included in the present invention, silicon-nitrogen materials having divalent hydrocarbon radicals attached to silicon atoms through silicon-carbon linkages. For example, also included among the silicon-nitrogen materials that can be employed in the practice of the invention, are arylenesilazanes, such as phenylene silazanes, and alkylenesilazanes such as methylene-silazanes. In addition, various other silicon-nitrogen materials, containing divalent hydrocarbon radicals are also contemplated including copolymers and terpolymers such as silicon-nitrogen materials containing intercondensed siloxane units and silarylenesilazane units, intercondensed silarylenesiloxane units and silazane units, intercondensed silazane units, silarylenesiloxane units, and siloxane units, etc.

The silicon-nitrogen materials that can be employed in the practice of the present invention include silicon-nitrogen polymer in the form of silazane and silazane-siloxane copolymers having at least 3 mole percent of chemically combined silazy units and up to 97 mole percent of combined siloxy units. The silazane polymers can include, for example, cyclics consisting of chemically combined $$-\underset{R'''}{\underset{|}{Si}}N\underset{}{\overset{R'''\;R''}{\diagup}}-$$

units, linear polymers having at least one unit selected from $$(R''_2N)(R''')_2SiN-\overset{R''}{\underset{|}{}}$$

and $$(R''')_3SiN-\overset{R''}{\underset{|}{}}$$

and consisting essentially of $$-\underset{R'''}{\underset{|}{Si}}N\underset{}{\overset{R'''\;R''}{\diagup}}-$$

units and polymers having at least one unit selected from $$(R''_2)N\underset{|}{\underset{}{Si}}N-\overset{R'''\;R''}{\diagup}$$

and $$(R''')_3SiN-\overset{R''}{\underset{|}{}}$$

and a sufficient amount of units selected from $$-\underset{R''}{\underset{|}{Si}}N\underset{}{\overset{R'''\;R''}{\diagup}}-,\;-\underset{|}{\underset{}{Si}}N\underset{}{\overset{R'''\;R''}{\diagup}}-,\;-\underset{|}{\underset{}{Si}}N\underset{}{\overset{R''}{|}}-$$

and to provide for a ratio of 1.5 to 3 of the sum of the R‴ and (R″)$_2$N radicals per silicon atom in said silazane polymer.

The silazane-siloxane copolymers can also be in the form of cyclics, and consist of chemically combined (R‴)$_2$SiO units and $$-\underset{R'''}{\underset{|}{Si}}N\underset{}{\overset{R'''\;R''}{\diagup}}-$$

units. Linear silazane-siloxane copolymers are also included where the moles percent of $$(R''')_cSiO_{\frac{4-c}{2}}$$

units can be as high as 97 moles percent, while the balance can be a unit selected from $$(R''')_cSiN\underset{}{\overset{R''}{|}}_{\frac{4-c}{2}}$$

$$(R''_2)N\underset{|}{\underset{}{Si}}O-,\;\mathrm{and}\;(R''_2)N\underset{|}{\underset{}{Si}}\;N\overset{R'''\;R''}{\diagup}$$

to provide for a ratio of the sum of R‴+(R″)$_2$N radicals per silicon atom of said silazane-siloxane copolymer of from 1.5 to 3.

The silicon nitrogen materials that can be employed as process aids in the practice of the present invention can be volatile liquids or, gummy, resinous, or crystalline solids, depending upon such factors as the molecular weight and the nature and average functionality of their respective chemically combined units. These silicon-nitrogen materials include for example, silyl amines as shown by formula 2, silazanes and fluid polymers consisting essentially of intercondensed siloxane units and silazane units terminated by triorganosiloxane units, polymers consisting essentially of intercondensed siloxane units with or without silazane units terminated by silyl amine units, etc. Typical of the methods that can be employed to make the materials that can be used in the present invention include the method shown by R. O. Sauer, et al. J.A.C.S. Vol. 68, 1946, p. 241–44, and in Patent 2,462,635—Haber, 2,885,370—Groszos et al., 2,579,416, 2,579,417, and 2,579,418—Cheronis. Examples of the polymers containing intercondensed siloxane and silazane units, and polysiloxanes terminated by silyl amine units that are operable in the present invention are shown in Patent 2,503,919—Patnode, and 2,865,918—Hurwitz et al. Some of the silyl amines that can be employed in the practice of the invention are shown in Patents 2,429,883—Johannson, 2,807,635—Breedervelt et al., and 2,758,127—Goldschmidt et al., etc.

Among the preferred silicon-nitrogen materials that are included by the silazanes as defined above are linear and cyclic silazanes having the formula:

(4)

$$\left[(R''')_3SiN\overset{R''}{\underset{|}{}}\right]_d \left[\underset{R'''}{\underset{|}{Si}}N\underset{}{\overset{R'''\;R''}{\diagup}}-N-\right]_n \left[Si(R''')_3\right]_d$$

where $n$ is a positive whole number, and is preferably 0 to 20, inclusive, and $d$ is a whole number equal to 0 to 1, inclusive, and where $d$ is equal to 0, $n$ is preferably equal to 3 to 7, inclusive, and R″ and R‴ are as defined above. Included among the silyl amines that can be employed in the practice of the invention as shown by Formula 2 are silyl amines which preferably have the following formula:

(5)     $(R'')_fSi(NR''_2)_{4-f}$ where R″ is as defined above, and $f$ is an integer equal to from 2 to 3, inclusive.

Illustrative of the silazanes that can be employed in the practice of the present invention as shown by Formula 4 are hexamethylcyclotrisilazane, octamethylcyclotetrasilazane, trimethyltriphenylcyclotrisilazane, trivinyltrimethylcyclotrisilazane, etc. Among the silyl amines that are included by Formula 5 are triphenylsilyl amine, dimethylphenylsilyl amine, amino silane, trimethylsilyl amine, dimethyldiaminosilane, etc.

In addition to the silazanes and silyl amines of Formulae 4 and 5, also included among the preferred silicon-nitrogen materials of the present invention are polysiloxanes having either terminal silyl amine units or silazane units as shown by the following formula (6) 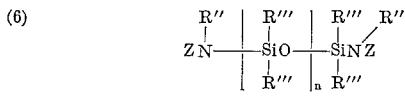

where $R''$, $R'''$ and $n$ are as defined above, and Z is a member selected from $R''$ and $-Si(R''')_3$. In preparing the compounds of Formula 6, ammonia or an amine is reacted at a temperature in the range of between about 0° C. to 60° C. with a halogenated polysiloxane having the formula (7) 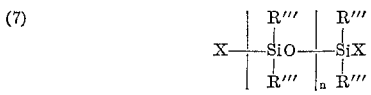

where $R'''$ and $n$ are as defined above, and X is a halogen radical such as chloro or bromo. If a terminal silazane radical is desired for example, a molar amount of $(R''')_3Si\ X$ can be reacted along with the halogenated polysiloxane, at least equivalent to the moles of halogen radicals contained therein. It will, of course, be appreciated that amines of the formula (8)  $H_2NR''$ are utilized for forming the silazy chain-stopped polysiloxanes of the invention where $R''$ is as defined above, while in instances where materials of Formula 6 having terminal silyl amine radicals are desired, amines, including amines of Formula 8 can be employed having at least one hydrogen available for reaction.

The halogen chain-stopped polydiorganosiloxanes of Formula 6 can be made by conventional procedures such as by the controlled hydrolysis of a diorganodihalosilane, for example dimethyldichlorosilane as taught in Patnode Patent 2,381,366 and Hyde Patents 2,629,726 and 2,902,507. Another procedure that can be employed involves equilibrating a mixture of a diorganodichlorosilane and a cyclic polydiorganosiloxane in the presence of a metal catalyst such as ferric chloride as shown in Sauer Patent 2,421,653. Although the various procedures utilized in forming the polysiloxanes of Formula 6 are not critical, generally it has been found desirable to maintain the halogen content of the resulting chain-stopped polysiloxane in the range of about 0.4 to about 35 percent, by weight, and preferably from about 5 to about 20 percent by weight. The halogen chain-stopped polysiloxane is preferably in the form of a chlorinated chain-stopped polydimethylsiloxane.

Included among the amines which can be employed with the halogenated polysiloxanes of Formula 6, some of which are shown by Formula 8 are ammonia, methyl amine, aniline, dimethyl amine, ethylphenyl amine, methylethyl amine, etc.

The organopolysiloxane polymers convertible to the cured, solid, elastomeric state operable in the present invention, shown above by Formula 1 can be viscous masses or gummy solids depending upon such factors as the state of condensation of the starting organpolysiloxane, polymerizing agent, etc. These organopolysiloxanes are convertible to the cured, solid, elastic state by employing a conventional curing catalyst. Examples of these organopolysiloxanes are shown in Agens Patent 2,448,756, Sprung et al. Patent 2,448,556, Sprung Patent 2,484,595, Krieble et al. Patent 2,457,688, and Marsden Patent 2,521,528—all the foregoing patents being assigned to the same assignee as the present invention. The organopolysiloxanes employed in the practice of the present invention can be employed by condensation of a liquid organopolysiloxane containing an average of about 1.95 to about 2.01 R radicals as defined in Formula 1 per silicon atom including cyclic polydiorganosiloxane, such as octamethylcyclotetrasiloxane, by means of conventional polymerizing agents that include for example, ferric chloride hexahydrate, phenylphosphoryl chloride, and various alkaline condensing agents such as potassium hydroxide, sodium hydroxide, etc.

Various curing agents that can be employed to effect more rapid conversion of the aforementioned organopolysiloxane polymers to the cured, solid, elastic state are for example, dibenzoyl peroxide, tertiary butyl perbenzoate, bis-(2,4-dichlorobenzoyl) peroxide, etc. These curing agents, or vulcanization accelerators, as they are often designated, can be present in amounts ranging from about 0.1 to as high as 4 to 8 percent or more by weight, based on the weight of the organopolysiloxane. High energy electron irradiation without curing agents can also be employed to convert the organopolysiloxane to the cured, solid, elastic state.

The finely divided inorganic oxide fillers that can be employed in the practice of the present invention, to make the organopolysiloxane compositions convertible to the elastomeric state to provide for the production of high strength organopolysiloxane elastomers are well known to the art, and commonly referred to as reinforcing fillers. Included among the inorganic oxide reinforcing fillers operable in the present invention are the silica fillers such as fume silica, precipitated silica, etc., and finely divided alumina. These finely divided inorganic oxide reinforcing materials can have a specific surface in the range of about 20 to 800 square meters per gram.

These fillers, depending upon their manufacture may contain or be free of hydroxyl groups either in the form of adsorbed moisture or bonded to silicon atoms and may be modified for example, by the introduction of silicon-bonded alkoxy groups in place of some hydroxyl groups. The preferred silica filler of the present invention is a fume silica filler made by burning processes including the vapor phase burning of silicon tetrachloride or ethyl silicate. Examples of other reinforcing silica fillers that can be employed in the practice of the present invention are shown in U.S. Patents 2,541,137 and 2,657,149. In addition to the aforementioned reinforcing fillers that can be employed in the practice of the invention, other fillers can also be employed for particular applications in the form of a mixture of one or more of the aforesaid reinforcing fillers and an extending filler. The extending fillers include for example, lithopone, calcium carbonate, titanium oxide, diatomaceous earth, etc. The proportions of reinforcing filler to extending filler which can be utilized in the organpolysiloxane composition of the present invention can vary widely. It has been found that organopolysiloxane elastomers having improved tensile strength can be made by utilizing at least about 5 parts to about 200 parts and preferably from about 10 to 70 parts of reinforcing filler per 100 parts of organopolysiloxane polymer. A proportion of up to 350 parts of filler per 100 parts of organopolysiloxane polymer can be employed, if desired, where the filler is employed in the form of a mixture of reinforcing and extending filler. In addition to the aforesaid ingredients, such as fillers, and curing catalysts, etc. other components can be utilized to modify the characteristics of the resulting organopolysiloxane formulations in accordance with the intended use desired. For example, other process acids can be employed along with the silicon-nitrogen materials of the present invention, such as alkoxy chain-stopped organopolysiloxanes as shown in Fekete Patent 2,954,357. Heat-age additives such as barium zirconate, iron octoate, etc., and plasticizers such as dibutyl phthalate, etc. can also be employed.

In the practice of the invention, the organopolysiloxane compositions of the present invention, convertible to improved organopolysiloxane elastomers, can be made by milling a mixture of an organopolysiloxane polymer convertible to the cured, solid, elastic state, a reinforcing amount of a high surface area silica filler, an effective amount of the silicon-nitrogen process aid of the present invention hereinafter referred to as "process aid," with a curing catalyst, etc. Experience has shown that in most instances, when adding the process aid and the filler to the polymer, either prior to or during the milling of the mixture, it has been found that optimum properties are achieved in the organopolysiloxane elastomers derived from the millable organopolysiloxane compositions, if the process aid is incorporated into the polymer prior to the filler. A preferred procedure, for example, in forming the organopolysiloxane composition of the present invention, whereby optimum properties are achieved in the cured elastomers derived therefrom, particularly where the process aid is a liquid at the temperature utilized during the milling procedure, is to form an homogeneous mixture of the process aid and polymer followed by the milling of the filler into the homogeneous mixture. The formation of the aforesaid homogeneous mixture can be accomplished either by the incorporation of the entire amount of process aid into the polymer utilized in forming the organopolysiloxane composition before adding the filler, or it can be made by the addition of increments of the process aid followed by increments of filler. Another procedure that can be employed is to add the process aid and filler to the polymer simultaneously. When employing the latter procedure, involving the simultaneous addition of filler and process aid to the polymer, care should be taken to avoid contact between the filler and the process aid in the absence of the polymer for periods exceeding a few seconds or more.

Depending upon the physical properties of the process aid utilized, the temperature at which the milling of the mixture of process aid, polymer and filler can be advantageously accomplished, can vary widely. Experience has shown, for example, depending of course on the physical properties of the process aid, that a temperature between the range of between about 0° C. to about 225° C. can be employed. It is preferred however, to operate at a temperature at about which the process aid is in the liquid state, to aid in the dispersion of the process aid throughout the polymer, prior to, or during the milling of the filler into the mixture of the process aid and polymer. Although it is preferred to avoid contacting the process aid and filler in the absence of the polymer for an extended period of time, such as a few seconds or more, it has been found that if the process aid is a solid, it can be advantageously added to the polymer, while mixed with the filler, as long as during the subsequent milling procedure, external heat is utilized to melt the process aid to facilitate its dispersion throughout the polymer to provide for intimate contact between the filler and the substantially homogeneous mixture of process aid and polymer.

In order that those skilled in the art will be better able to practice the invention, the following examples are given by way of illustration and not by way of limitation. All parts are by weight.

*Example 1*

An organopolysiloxane composition of the present invention, convertible to the cured, solid, elastic state was prepared by milling a mixture of a dimethylpolysiloxane, fume silica and hexamethylcyclotrisilazane.

The dimethylpolysiloxane polymer convertible to the cured, solid, elastic state was prepared by heating a mixture of 100 parts of octamethylcyclotetrasiloxane, 0.115 part of tetramethyltetravinylcyclotetrasiloxane, and about one-tenth part of tetramethyldivinyldisiloxane in the presence of 0.01 part of potassium hydroxide at a temperature in the range of between about 150° C. to 165° C. while the mixture was agitated. After a period of about 4 hours time, the reaction was stopped and there was recovered a polydimethylsiloxane polymer having a minor amount of vinyl radicals attached to silicon through carbon-silicon linkages and a viscosity of about $7 \times 10^6$ centipoises at 25° C.

Hexamethylcyclotrisilazane was prepared by slowly adding 1290 parts of dimethyldichlorosilane to a saturated solution of ammonia in about 1700 parts of benzene, while agitating the mixture. During and subsequent to the addition of the dimethyldichlorosilane, ammonia was bubbled into the mixture while the temperature was maintained below 50° C. Additional ammonia was bubbled through the mixture until no further ammonium chloride precipitated. The product was recovered by stripping off the benzene under a pressure of about 40 millimeters. There was recovered 650 parts of product consisting of hexamethylcyclotrisilazane and octamethylcyclotetrasilazane which were fractionally distilled further to effect the separation of the hexamethylcyclotrisilazane which boils at 188° C. from the octamethylcyclotrisilazane which boils at 224° C.

To a mixture of 100 parts of the above-described dimethylpolysiloxane and 10 parts of hexamethylcyclotrisilazane, was added 40 parts of fume silica while milling the mixture of polymer and process aid. The resulting organopolysiloxane composition was allowed to age for 24 hours. To 100 parts of the resulting organopolysiloxane composition there was added by a milling operation, 1.4 parts of a mixture of 50 percent 2,4-dichlorobenzoyl peroxide in a dimethylpolysiloxane oil. The latter composition was then sheeted, formed into test slabs and cured. The balance of the organopolysiloxane composition that was free of curing catalyst was aged for an extended period of time.

Following the above procedure, an organopolysiloxane composition was made with octamethylcyclotetrasilazane as a process aid, and a composition was made that was free of a process aid. The various organopolysiloxane compositions that were prepared for aging for an extended period of time, were tested for structure after a period of seven days and after a period of fourteen days. The effects of structure were measured in terms of "Knit Time" by the following procedure.

Thirty grams of organopolysiloxane composition were added in small pieces to the nip of the roll of a two roll differential mill 3" x 8". The speed ratio of the rolls was 1.42 to 1, and the faster roll revolved at a speed of about 60 r.p.m. The mill roll clearance was adjusted to pass a 12 mill fixed soft solder slug at a temperature of around 70 to 90° F. A preliminary pass was often required at somewhat slightly wider settings to reduce the sample thickness. When all of the compound had passed through the nip once, a stopwatch was triggered and the timing begun. The compound was added to the nip again and in order to keep the "bank" of organopolysiloxane composition in motion, it was sometimes necessary to open the mill slightly for a brief interval and then return to the predetermined 12 mill adjustment. The timing was continued until the compound became plastic and completely covered the width of the faster roll in the form of a continuous solid film. As soon as this happened, the timing was stopped and this elapsed time was recorded as "Knit Time."

The test slabs from the above-described organopolysiloxane compositions containing curing catalyst, that had been sheeted, were press-cured and then oven-cured for 1 hour at 300° F., and for 24 hours at 480° F. Table I below shows the results obtained from the various organopolysiloxane compositions prepared in accordance with the present invention and an organopolysiloxane composition that was free of a process aid. In Table I, "K.T." is Knit Time in seconds, "H" is Hardness (Shore A), "T" is Tensile Strength (p.s.i.), "E" is Elongation (percent).

TABLE I

| Process aid | Parts | K.T. | | 1 hr./300° F. | | | 24 hrs./480° F. | | |
|---|---|---|---|---|---|---|---|---|---|
| | | 7 da. | 14 da. | H | T | E | H | T | E |
| Control | | 967 | 1,352 | 73 | 975 | 305 | 73 | 780 | 255 |
| Hexamethylcyclotrisilazane | 10 | 8 | 7 | 54 | 1,310 | 450 | 54 | 930 | 300 |
| Octamethylcyclotetrasilazane | 10 | 8 | 7 | 53 | 1,260 | 485 | 54 | 910 | 330 |

*Example 2*

An organopolysiloxane composition was prepared by hot milling at a temperature of about 125° C., a mixture of 100 parts of the dimethylpolysiloxane of Example 1, 40 parts of fume silica and 7 parts of triphenylsilylamine.

The triphenylsilylamine process aid was prepared by adding dropwise to 600 parts of toluene saturated with ammonia, a solution of 75 parts of triphenylchlorosilane in 600 parts of toluene. During the addition, which lasted about 3¼ hours, and for a period of thirty minutes thereafter, ammonia was constantly bubbled through the mixture. To the resulting mixture there was added 25 parts of water to aid the separation of the organic layer from the salt by-product. There was recovered 55 parts of final product which melted at a temperature of 45° C. to 53° C.

Following the procedure of Example 1, slabs were prepared from the resulting curable organopolysiloxane composition.

Table II shows the results obtained from the respective compositions with respect to knit time and physical properties of the cured slabs. The term "Hot Mill" refers to a milling technique employed to melt the solid triphenylsilyl amine using external heat.

The trimethylsilazy terminated polysiloxane was made by reacting ammonia with a mixture of a chlorine chain-stopped polydimethylsiloxane and trimethylchlorosilane. The chlorine chain-stopped polydimethylsiloxane was prepared by adding over a two hour period to 800 parts of dimethyldichlorosilane, a mixture of 100 parts of water and 206 parts of dioxane. The resulting mixture was heated to a reflux with stirring until it became homogeneous. The mixture was then stripped, in vacuo, at a pot temperature of 202° C. at 12 millimeters pressure. The stripped hydrolyzate was then filtered to yield 323 parts of a clear oil containing 4.9 percent hydrolyzable chlorine.

In preparing the trimethylsilazy stopped polysiloxane process aid, there was added to a saturated solution of ammonia and 350 parts of toluene a mixture of 200 parts of the above-described chlorine chain-stopped polydimethylsiloxane and 75.8 parts of trimethylchlorosilane over a period of three hours. During the addition the temperature ranged from 27° C. to as high as 42° C. Ammonia was constantly bubbled through the mixture during the reaction and for 30 minutes after the addition was completed. Excess salts were then filtered off from the mixture and volatile materials boiling up to 100° C. at 3 millimeters pressure were then distilled off.

The results obtained with the organopolysiloxane composition containing the silaxy terminated process aid, as compared to a organopolysiloxane composition pre-

TABLE II

| Process aids | Parts | Hot mill | Knit-time | | | 1 hr./300° F. | | | 24 hrs./480°F. | | |
|---|---|---|---|---|---|---|---|---|---|---|---|
| | | | 7 | 14 | 28 | H | T | E | H | T | E |
| Silyl amine | 7 | Yes | 2 | 6 | 9 | 51 | 1,455 | 530 | 55 | 1,115 | 340 |
| None | | No | 114 | 1,391 | 1,581 | 76 | 1,195 | 330 | 78 | 870 | 240 |

*Example 3*

An organopolysiloxane composition was prepared by milling together a mixture of 100 parts of the dimethylpolysiloxane of Example 1, 40 parts of fume silica and 10 parts of a fluid trimethylsilazy-stopped polysiloxane containing about 5 mole percent of terminal trimethylsilazy units $(CH_3)_3SiNH-$ chemically combined with 95 mole percent of dimethylsiloxy units

based on the total moles of chemically combined units of the polysiloxane.

pared by the same procedure without a process aid is shown below in Table III.

TABLE III

| Process aid | Parts | Knit time | | | 1 hr./300° F. | | | 24 hrs./400° F. | | |
|---|---|---|---|---|---|---|---|---|---|---|
| | | 7 | 14 | 28 | H | T | E | H | T | E |
| Silazane | 10 | 9 | 11 | 13 | 50 | 1,195 | 470 | 53 | 1,015 | 320 |
| None | | 520 | 699 | 812 | 74 | 940 | 340 | 76 | 665 | 230 |

In addition to the above-described organopolysiloxane composition, an organopolysiloxane composition is also made containing 10 parts of a process aid in the form of an amine-stopped polydimethylsiloxane. This amine-stopped polysiloxane is prepared following the procedure used to form the trimethylsilazy terminated siloxane except that trimethylchlorosilane is not reacted with the chlorine chain-stopped polydimethylsiloxane. It is found that the results obtained with the amine-stopped polydimethylsiloxane are substantially the same as that obtained with the silazane as shown in Table III.

In addition to the organopolysiloxane compositions of Example 1, containing hexamethylcyclotrisilazane and octamethylcyclotetrasilazane as process aid, additional organopolysiloxane compositions were prepared following the same procedure but utilizing a variety of different linear and cyclic silazanes. These silazanes which were substituted with methyl radicals, phenyl radicals, and mixtures thereof, were prepared following the procedure shown by R. O. Sauer and R. A. Hasek, J.A.C.S. vol. 68, 1946, p. 241–44.

In addition to the above-described silazane process aids prepared by the method of R. O. Sauer and R. A. Hasek, a polymethylsilazane process aid having a methyl to Si ratio of 1.91 was made by the following procedure.

A toluene solution of dimethyldichlorosilane and methyltrichlorosilane (230 parts and 25.5 parts, respectively) was added to about 1700 parts of a saturated solution of ammonia in toluene. During the addition ammonia was constantly bubbled into the mixture. After no further salt precipitation was noticed, ammonia was bubbled into the mixture for an additional 15 minutes and then the salt that had formed during the reaction was filtered off. The final product was recovered by distilling off the toluene at atmospheric pressure. It was a silazane polymer having chemically combined

units and

units and a $CH_3$ to Si ratio of 1.91 to 1.

A polymethylsilazane having a methyl to Si ratio of about 1.5 to 1 was also made following the above procedure except that a toluene solution of dimethyldichlorosilane and methyltrichlorosilane in an equimolar ratio was reacted with ammonia. It was a silazane polymer having chemically combined

units and

units.

Table IV shows the results obtained by utilizing various silazane process aids prepared as previously described in accordance with the practice of the invention as compared to an organopolysiloxane composition free of process aid. In the table "Me" represents methyl and "φ" represents phenyl.

The procedure employed in making the bis-[N-ethylamino]dimethylsilane was the same procedure employed for making triphenylsilyl amine except the temperature was maintained at about −5 to +5° C. at all times during the reaction. The amine was separated by distillation at a temperature of about 138° C.

It was found that the Knit Time of the organopolysiloxane composition was about 7 sec. after a period of seven days indicating that the amine was a valuable process aid. A slab that had been cured at 480° F. for 24 hours had a Shore A Hardness of 48, elongation percent of 330 and tensile of 1040 p.s.i.

Example 5

Organopolysiloxane compositions were prepared by milling mixtures of 100 parts of the dimethylpolysiloxane of Example 1, with 15 to 80 parts of fume silica filler and from 0.5 to 50 parts of hexamethylcyclotrisilazane. The various organopolysiloxane compositions prepared in the practice of the invention were tested for structure after a period of 24 hours and compared with corresponding compositions that were free of process aid. The results shown below in Table V where "Filler" is shown in parts, and "K.T." is Knit-Time in seconds.

TABLE V

| Filler | Process aid | Parts | K. T. |
|---|---|---|---|
| 15 | Yes | 0.5 | 5 |
|  | No |  | 35 |
| 40 | Yes | 4 | 65 |
|  | No |  | 400 |
| 40 | Yes | 25 | 8 |
|  | No |  | 400 |
| 70 | Yes | 25 | 65 |
|  | No |  | Infinite |
| 80 | Yes | 50 | 180 |
|  | No |  | Infinite |

In addition to the results shown in Table V, it was found that satisfactory results were achieved with 100 parts of hexamethylcyclotrisilazane per 100 parts of the dimethylpolysiloxane polymer and with as high as 110 parts of fume silica. Mixtures of fume silica with an extending non-reinforcing filler such as ground quartz could be utilized as high as 340 parts of filler per 100 parts of organopolysiloxane polymer.

In order to further illustrate the valuble results achieved by the practice of the present invention, a comparison was made between organopolysiloxane compositions of the present invention containing hexamethylcyclotrisilazane as a process aid, and the same compositions containing a silanol chain-stopped polysiloxane as taught by Konkle

TABLE IV

| Process Aid | Parts | Knit-time | | | 1 hr./300° F. | | | 24 hrs./480° F. | | |
|---|---|---|---|---|---|---|---|---|---|---|
| | | 7 | 14 | 28 | H | T | E | H | T | E |
| None | 0 | 114 | 1,391 | 1,581 | 76 | 1,195 | 330 | 78 | 870 | 240 |
| [(Me)₂SiNH]₃ | 10 | 4 | 4 | 3 | 55 | 1,320 | 430 | 58 | 1,060 | 280 |
| [(Me)₂SiNH]₄ | 10 | 8 | 7 | 9 | 54 | 1,220 | 500 | 54 | 1,015 | 380 |
| [(Me)₂Si]₂NH | 6 | 112 | 109 | 99 | 58 | 1,365 | 360 | 60 | 805 | 240 |
| (Me)₃SiNH]₂(Me)₂Si | 7 | 2 | 2 | 4 | 52 | 1,200 | 480 | 53 | 1,145 | 340 |
| [(φ)₂MeSi]₂NH | 7 | 2 | 3 | 3 | 44 | 1,610 | 650 | 48 | 1,340 | 470 |
| [(Me)₃SiNH]₂(φ)₂Si | 7 | 32 | 38 | 47 | 51 | 1,595 | 560 | 56 | 900 | 320 |
| [(φ)₂SiNH]₃ | 7 | 8 | 12 | 18 | 53 | 1,240 | 470 | 47 | 1,185 | 460 |
| (Me)₂SiNH](φ)₂SiNH]₂ | 7 | 2 | 3 | 2 | 51 | 1,300 | 560 | 51 | 1,115 | 370 |
| [Meφ SiNH]₃ | 10 | 2 | 2 | 3 | 51 | 1,375 | 610 | 51 | 1,150 | 440 |
| (Me)₁.₉SiNH | 7 | 7 | 7 | 6 | 54 | 1,295 | 440 | 71 | 710 | 130 |
| (Me)₁.₅SiNH | 7 | 15 | 15 | 16 | 27 | 280 | 760 | 67 | 490 | 100 |

Example 4

An organopolysiloxane composition was prepared following the procedure of Example 2, except that bis-[N-ethylamino]dimethylsilane was substituted for triphenylsilyl amine. A hot mill was utilized at a temperature of about 125° C.

et al. Patent 2,890,188 and a methoxy stopped polysiloxane as taught by Kekete Patent 2,954,357.

The silanol chain-stopped polysiloxane that was employed as a process aid as taught in the aforementioned Konkle et al. patent was prepared as follows:

Dimethyldichlorosilane was hydrolyzed by adding it slowly to a slurry of sodium bicarbonate and water. The oil layer which formed was separated and dried with anhydrous sodium sulfate. The resulting oil was found to contain 5.2 weight percent of silicon-bonded hydroxyl units.

The methoxy chain-stopped polysiloxane that was utilized, was prepared by reacting a stoichiometric excess of methanol with the chlorine chain-stopped polydimethylsiloxane of Example 3. The methanol was added to the chlorine chain-stopped polydimethylsiloxane and the mixture was refluxed for two hours. After stripping the volatiles, an oil was obtained having 7 mole percent of terminal methoxy groups.

In Table VI below the results are shown that were obtained from the various organopolysiloxane compositions, utilizing the process aid of the present invention as compared to the process aids of the prior art.

TABLE VI

| Process aid | Parts | Knit-time (sec.) | | 1 hr./360° F. | | | 24 hrs./480° F. | | |
|---|---|---|---|---|---|---|---|---|---|
| | | 14 da. | 28 da. | H | T | E | H | T | E |
| Silazane | 6 | 5 | 6 | 56 | 1,410 | 610 | 63 | 890 | 320 |
| Methoxy oil | 7 | 5 | 7 | 49 | 1,120 | 800 | 65 | 666 | 390 |
| Silanol oil | 12 | 6 | 11 | 57 | 1,150 | 480 | 64 | 777 | 290 |

The above results show that the silicon-nitrogen process aids of the present invention result in organopolysiloxane compositions convertible to the cured, solid, elastic state which have tensile strengths superior to organopolysiloxane compositions of the prior art.

The aforedescribed examples have of necessity been limited to only a few of the many process variables and composition variables which are practicable in the practice of the present invention. It should be understood, however, that the composition of the present invention and methods of making them are illustrated by both the specific examples as well as by the detailed description of the present invention which preceded these examples.

What I claim as new and desire to secure by Letters Patent of the United States is:

1. Organopolysiloxane compositions convertible to the cured, solid, elastic state which comprise (A) 100 parts of an organopolysiloxane having a viscosity of at least 100,000 centipoises at 25° C. of the formula $$(R)_aSiO_{\frac{4-a}{2}}$$

(B) 0.1 to 100 parts of a silicon-nitrogen material, and (C) from 5 to 200 parts of an inorganic oxygen-containing filler having a specific surface in the range of from 20 to 800 square meters per gram, said silicon-nitrogen material being a member selected from the class consisting of (a) a silyl amine having the formula $$(R')_bSi[N(R'')_2]_{4-b}$$

(b) a silicon-nitrogen compound having the formula

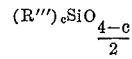

$$(Y)(R''')_2SiNSi(R''')_2Y$$

where Y is selected from R''' and R''$_2$N—, and (c) a silicon-nitrogen polymer comprising (1) from 3 to 100 mole percent chemically combined structural units selected from the class consisting of units having the formula

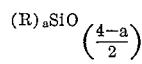

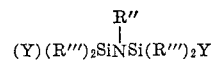

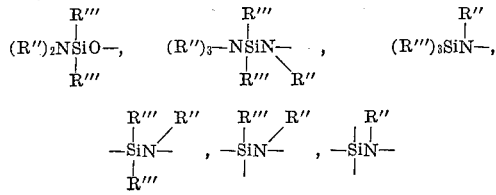

and (2) from 0 to 97 mole percent chemically combined structural units represented by the formula $$(R''')_cSiO_{\frac{4-c}{2}}$$

where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazy unit are joined to a member selected from the class consisting of an R''' radical and (R'')$_2$N radical, and where the ratio of the sum of said R''' radicals and said (R'')$_2$N radicals to the silicon atoms of said silicon-nitrogen polymer has a value of 1.5 to 3, inclusive, where R is a member selected from the class consisting of monovalent hydrocarbon radicals, halogenated monovalent hydrocarbon radicals and a mixture of monovalent hydrocarbon radicals and cyanoalkyl radicals, R' is a member selected from the class consisting of hydrogen, monovalent hydrocarbon radicals, and alkoxy radicals having a chain length of from 1 to 8 carbon atoms, and R'' is a member selected from the class consisting of hydrogen and monovalent hydrocarbon radicals, and R''' is a member selected from hydrogen, monovalent hydrocarbon radicals and cyanoalkyl radicals, $a$ is equal to from 1.95 to 2.01, $b$ is an integer equal to from 2 to 3, inclusive, and $c$ is a whole number equal to from 0 to 3, inclusive.

2. An organopolysiloxane composition in accordance with claim 1, where said silicon-nitrogen material is a silyl amine having the formula $$(R'')_bSi[N(R'')_2]_{4-b}$$

where R'' is a member selected from the class consisting of hydrogen and monovalent hydrocarbon radicals and $b$ is an integer equal to from 2 to 3, inclusive.

3. A composition in accordance with claim 2, where said silyl amine is triphenylsilyl amine.

4. A composition in accordance with claim 1, where said silicon-nitrogen material is a cyclic silazane having the formula

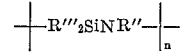

where R'' is a member selected from the class of hydrogen and monovalent hydrocarbon radicals, R''' is a member selected from the class consisting of hydrogen, monovalent hydrocarbon radicals, and cyanoalkyl radicals, and $n$ is an integer equal to from 3 to 20, inclusive.

5. An organopolysiloxane composition in accordance with claim 4, where said cyclic silazane is hexamethylcyclotrisilazane.

6. An organopolysiloxane composition in accordance with claim 4, where said cyclic silazane is 1,3,5-trimethyl-1,3,5-triphenylcyclotrisilazane.

7. An organopolysiloxane composition in accordance with claim 1, where said silicon-nitrogen material is a copolymer having the formula

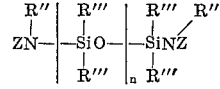

where Z is a member selected from the class consisting of R″ radicals, and

radicals, n is an integer equal to from 1 to 20, inclusive, R″ is a member selected from the class consisting of hydrogen and monovalent hydrocarbon radicals, and R‴ is a member selected from the class consisting of hydrogen, monovalent hydrocarbon radicals and cyanoalkyl radicals.

8. An organopolysiloxane composition in accordance with claim 7, where said copolymer is a trimethyl silazy chain-stopped polydimethylsiloxane.

9. An organopolysiloxane composition in accordance with claim 1, where said silicon-nitrogen material is a silazane having the formula

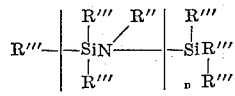

where n is an integer equal to from 1 to 20, inclusive, R″ is a member selected from the class consisting of hydrogen and monovalent hydrocarbon radicals, and R‴ is a member selected from the class consisting of hydrogen, monovalent hydrocarbon radicals and cyanoalkyl radicals.

10. An organopolysiloxane composition in accordance with claim 9, where said silazane is substituted with a mixture of methyl and phenyl radicals attached to silicon through carbon-silicon linkages.

11. An organopolysiloxane composition in accordance with claim 1, where said silicon-nitrogen material is utilized in a proportion of between about 4 to 50 parts, per 100 parts of said organopolysiloxane.

12. An organopolysiloxane composition in accordance with claim 1, where said filler is a fume silica filler.

13. A process comprising milling together a mixture of (A) 100 parts of an organopolysiloxane having a viscosity of at least 100,000 centipoises at 25° C. of the formula:

$$(R)_a SiO_{\frac{4-a}{2}}$$

(B) 0.1 to 100 parts, of a silicon-nitrogen material, and (C) from 5 to 200 parts of an inorganic oxygen-containing filler having a specific surface in the range of from 20 to 800 square meters per gram, said silicon-nitrogen material being a member selected from the class consisting of (a) a silyl amine having the formula $$(R')_b Si[N(R'')_2]_{4-b}$$

(b) a silicon-nitrogen compound having the formula

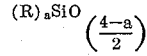

where Y is selected from R‴ and R″$_2$N—, and (c) a silicon-nitrogen polymer comprising (1) from 3 to 100 mole percent chemically combined structural units selected from the class consisting of units having the formula

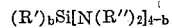

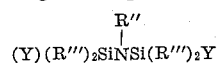

and (2) from 0 to 97 mole percent chemically combined structural units represented by the formula $$(R''')_c SiO_{\frac{4-c}{2}}$$

where the silicon atoms of said silicon-nitrogen polymer are joined to each other by a member selected from the class consisting of an SiOSi linkage and an SiNR″Si linkage, the free valences of said silicon atoms other than those joined to a member selected from the class consisting of oxygen to form a siloxy unit, and nitrogen to form a silazy unit are joined to a member selected from the class consisting of an R‴ radical and (R″)$_2$N radical, where the ratio of the sum of said R‴ radicals and said (R″)$_2$N radicals to the silicon atoms of said silicon-nitrogen polymer has a value of from 1.5 to 3, inclusive, where R is a member selected from the class consisting of monovalent hydrocarbon radicals, halogenated monovalent hydrocarbon radicals and a mixture of monovalent hydrocarbon radicals and cyanoalkyl radicals, R' is a member selected from the class consisting of hydrogen, monovalent hydrocarbon radicals, and alkoxy radicals having a chain length of from 1 to 8 carbon atoms, R″ is a member selected from the class consisting of hydrogen and monovalent hydrocarbon radicals, R‴ is a member selected from the class consisting of hydrogen, monovalent hydrocarbon radicals and cyanoalkyl radicals, a is equal to from 1.95 to 2.01, b is an integer equal to from 2 to 3, inclusive, and c is a whole number equal to from 0 to 3, inclusive.

14. A process in accordance with claim 13, where said organopolysiloxane and said silicon-nitrogen material are in the form of a substantially homogeneous mixture while being contacted with said filler.

15. A process in accordance with claim 13, where the filler is added to said organopolysiloxane in the presence of said silicon-nitrogen material, while the resulting mixture of said organopolysiloxane, said silicon-nitrogen material, and said filler is being milled.

16. A process in accordance with claim 13, which is performed at a temperature in the range of between 0° C. to 225° C.

17. A process in accordance with claim 13, where said silicon-nitrogen material and said filler are added simultaneously to said organopolysiloxane while said organopolysiloxane is being milled.

18. A process in accordance with claim 13, which is performed at a temperature above the melting point of said silicon-nitrogen material.

References Cited by the Examiner

UNITED STATES PATENTS

| | | | |
|---|---|---|---|
| 2,448,565 | 9/1948 | Wright et al. | 260—37 |
| 2,503,919 | 4/1950 | Patnode | 260—448.2 |
| 2,610,167 | 9/1952 | Te Grotenhuis | 260—37 |
| 2,983,697 | 5/1961 | Brown et al. | 260—37 |
| 3,027,344 | 3/1962 | Grabicki et al. | 260—375 |
| 3,032,528 | 5/1962 | Nitzsche et al. | 260—37 |

OTHER REFERENCES

"Silicones" (Fordham) Published by Georges Newnes Limited, Great Britain, 1960. Page 161 relied on.

ALLAN LIEBERMAN, *Primary Examiner.*

MORRIS LIEBMAN, *Examiner.*

J. W. BEHRINGER, J. E. CALLAGHAN,
*Assistant Examiners.*